May 3, 1932.  W. A. HYLAND  1,856,417
FERTILIZER DISTRIBUTOR
Filed June 22, 1928   2 Sheets-Sheet 1

Inventor
William A. Hyland
Brown, Jackson,
Boettcher & Dienner
by
Attorneys

May 3, 1932. W. A. HYLAND 1,856,417
FERTILIZER DISTRIBUTOR
Filed June 22, 1928 2 Sheets-Sheet 2
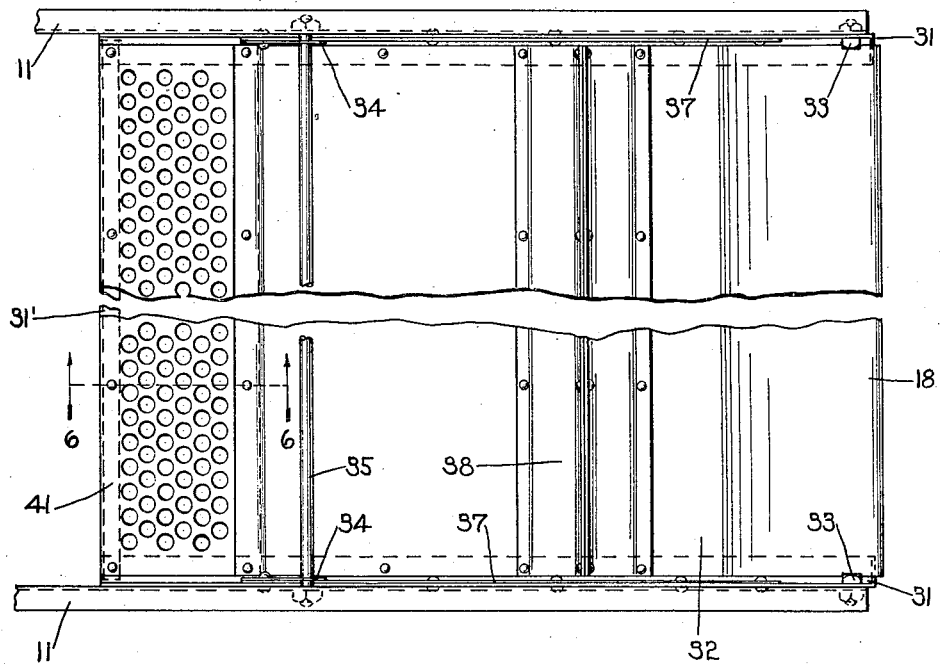
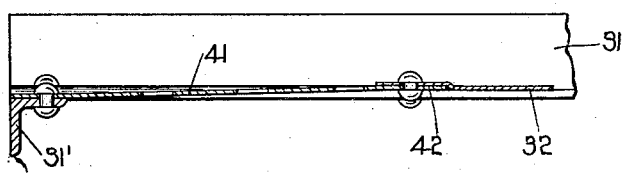
Inventor
William A. Hyland
by Brown, Jackson,
Boettcher & Diemer
Attorneys Patented May 3, 1932

1,856,417

UNITED STATES PATENT OFFICE

WILLIAM A. HYLAND, OF EAST MOLINE, ILLINOIS, ASSIGNOR TO DEERE & COMPANY, OF MOLINE, ILLINOIS, A CORPORATION OF ILLINOIS

FERTILIZER DISTRIBUTOR

Application filed June 22, 1928. Serial No. 287,467.

This invention relates generally to fertilizer distributors, and has particular reference to the provision of improved attachments for converting the ordinary manure spreader into a fertilizer distributor for spreading lime and other like pulverulent fertilizers.

One of the objects of the invention is to provide improved means for obtaining a more thorough or efficient distribution of the lime. Such means comprises a directing member cooperating with the rotating beater cylinder of the spreader and serving to deflect the lime from the beater cylinder back to the wide spreading device at the rear end of the vehicle, which wide spreading device projects the lime laterally and rearwardly in a fan-shaped dispersion. The improved directing means, referred to, functions to deflect the bulk of the lime into the zone of operation of this wide spreading device.

A further object of the invention is to provide improved means which will uniformly proportion the feed of the lime to the beater cylinder. In distributing lime from the ordinary manure spreader, the entire rear end of the pile of lime is continuously presented to the action of the beater cylinder, as the lime is conveyed rearwardly by the feeding apron, with the result that large quantities of lime frequently slide down the end of the pile into the path of the beater cylinder and cause large quantities of lime to be intermittently distributed by the spreader. The present invention avoids this difficulty by providing means which compel all of the lime to pass through a feed regulating opening before being presented to the action of the beater cylinder. This feed regulating opening is provided with an adjustable gate, which may be set in different positions, to control the quantity of lime distributed per acre of ground covered.

Another object of the invention is to provide means which will effect a uniform distribution of the small proportion of lime which is frequently carried past the beater cylinder and is conveyed forwardly between the lower flight of the feeding apron and a pan which usually extends under this portion of the apron. Heretofore, each feeding slat on the apron, in carrying a small quantity of the lime past the feeder cylinder, has dropped this quantity from the front end of the lower pan in an accumulated mass on the ground. The invention provides means which will effect a uniform distribution of these quantities of lime conveyed forwardly along the pan by each apron slat.

Another object is to provide an improved construction of paddle or blade for mounting on the teeth of the beater cylinder and to provide an improved construction and arrangement of parts which will enable the paddle or blade to be quickly attached to, and detached from, the beater cylinder.

Referring to the accompanying drawings, wherein I have illustrated a preferred embodiment of my invention:

Figure 5 is a plan view of the pan which is disposed below the beater wheel and the feeding apron, and Figure 6 is a transverse sectional view through the perforated front end of the pan, taken on the plane of the line 6—6 of Figure 5.

Figure 1:
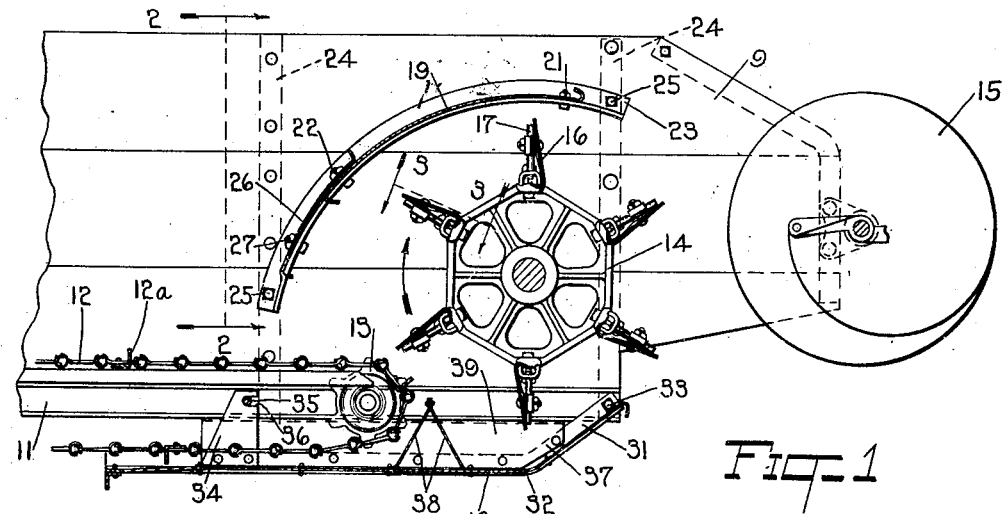
Figure 1 is a longitudinal sectional view through the rear portion of a conventional manure spreader, illustrating my improved attachments mounted therein.

Figure 1 illustrates the rear portion of any conventional type of manure spreader, the bed or body thereof being represented by the side walls 9 mounted on a suitable frame structure represented by the channel bars 11. This end of the vehicle is usually supported on traction wheels (not shown) which are usually arranged to drive the feeding apron, beating cylinder and wide spread device in a manner well-known. Travelling lengthwise of the bed is the usual feeding apron 12, comprising spaced cross slats 12ª, which serve to feed the load along the bottom of the bed towards the rear end of the vehicle. The connecting links of the feeding apron pass downwardly around sprocket wheels 13 and thence pass forwardly under the bed up to similar sprocket wheels at the front end of the vehicle. The load conveyed rearwardly by the slow motion of the feeding apron 12 is presented to the action of the rotating beater wheel 14, which, in its upward or clockwise rotation, as viewed in Figure 1, picks up portions of the load at the end of the apron and throws the same rearwardly into the zone of operation of a wide spreading device 15. Such wide spreading device comprises any suitable arrangement of paddles or blades functioning to project a considerable part of the fertilizer laterally, so that the fertilizer is spread in a fan-shaped dispersion from the rear end of the implement. The foregoing represents, generally, the action occurring when the implement is used for spreading manure.

To adapt such implements to the spreading of lime and other like materials, it has been heretofore proposed to mount paddles or blades 16 on the radially projecting teeth 17 of the beater wheel, and to dispose a pan 18 below the beater wheel and below the rear portion of the apron, said pan serving the dual purpose of confining the bulk of the material to the action of the beater wheel and of effecting a distribution of such proportion of the material as passes downwardly between the feeding apron and said wheel. I have found that the distributing efficiency of such prior type of machine can be increased if a larger proportion of the lime can be projected rearwardly into the zone of operation of the wide spreading device 15, so as to be thrown laterally therefrom. The action of the beater wheel 14 on lime is considerably different than it is on manure, the blades 16 on the rising side of the wheel tending to throw a considerable quantity of the lime up into the air substantially directly above the wheel. To avoid this objection and to have the major portion of the lime projected against the wide spreading device 15, I propose providing directing means in the form of a shield 19, extending partially over the top of the beater wheel and serving to deflect practically all of the lime back to the wide spreading device 15. Said shield consists of an arcuate plate extending from side to side of the bed and so proportioned and curved that the lime carried upwardly on the rising side of the beater wheel 14 will be deflected rearwardly into the wide-spread device 15. The lateral edges of the shield 19 are secured by bolts 21, 22 to the inwardly extending flanges of arcuate angle bars 23, which are secured to the inner sides of the side walls 9.

The same holes which receive the rivets for joining the vertical frame bars 24 to the side boards 9 may be utilized to receive the bolts 25 which secure the ends of each arcuate angle 23 to the body of the implement. Thus, the mounting of the shield 19 may be arranged so as to necessitate no material alteration in standard spreader design.

Figure 2:
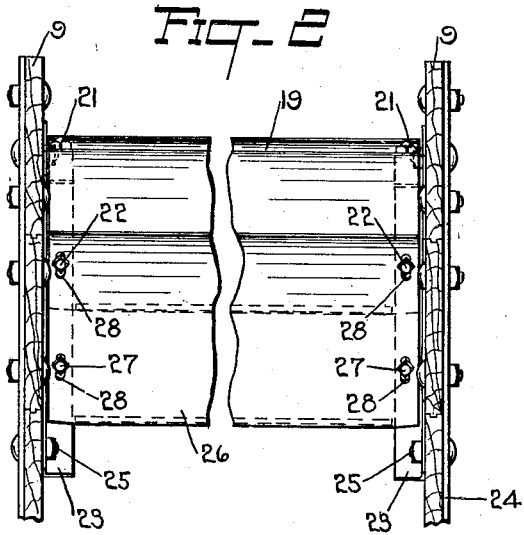
Figure 2 is a fragmentary transverse sectional view, taken on the plane of the line 2—2 of Figure 1.

The shield 19 also functions as a partition or baffle for obtaining a substantially uniform rate of feed of the lime to the beater wheel 14, by preventing large quantities of the lime from sliding down the end of the pile intermittently into the path of the blades on the beater wheel. Cooperating with the shield, in its feed-regulating function, is an adjustable gate 26, which is slidably mounted on the lower inner ends of the angle bars 23. The upper edge of the gate is secured to said angle bars by the bolts 22 and the lower portion thereof is secured to the angle bars by bolts 27. Referring to Figure 2, it will be seen that the two pairs of bolts 22 and 27 extend through slots 28 cut in the edges of the gate, whereby upon loosening the nuts on said bolts, the gate can be moved upwardly or downwardly, to increase or diminish the area of the feed opening between the lower edge of said gate and the feeding conveyor 12. Ordinarily, the rate of spreading, per acre of ground, will be controlled primarily by adjusting the rate of feed of the conveyor apron 12, and the adjustment of the gate 26 will be for the purpose of adapting the operation to different conditions of the lime. However, the gate 26 may also be utilized to control the spreading rate of the implement.

Attention is directed to the fact that, by virtue of passing all of the lime through the feed opening between the bottom edge of the gate and the feeding apron, the lime will be conveyed to the beater wheel in a stratum or layer of substantially constant proportions, irrespective of the height of the load of lime in the bed. When the shield 19 and gate 26 are omitted and the end of the pile or load is presented directly to the beater wheel 14, there is frequently a tendency of the beater wheel to undermine the end of the pile with the result that small avalanches of the lime slide down upon the beater wheel and produce an irregular distribution of the lime. As shown in Figure 1, the transverse edges of the shield 19 and of the gate 26 are preferably bent over to avoid sharp edges.

The pan 18 is preferably built up of two side angle bars 31 and a plate 32 extending between and suitably secured to the inwardly extending flanges of said angle bars. The rear ends of the angle bars are bent upwardly for fastening to the vehicle body by bolts 33, which secure the vertical frame bars 24 to the sill channels 11, this enabling the rear end of the pan to be mounted on the implement without alteration or rearrangement, and the rear portion of the plate 32 is also curved upwardly, similarly to the angle bars, as shown in Figure 1. The front portions of the angle bars and plate extend under the lower flight of the feeding apron 12 and are supported in such position by hook brackets 34, secured to the side angles 31 and extending upwardly therefrom on opposite sides of the feeding apron.

A tie rod 35 usually extends between the frame channels 11, at a point forward of the sprocket wheels 13, and the rear edges of the two hanger brackets 34 are formed with slots 36 for hooking over this tie rod 35. In mounting the pan on the implement, it will therefore be seen that it is only necessary to hook the brackets 34 over the tie rod 35 and to bolt the rear end of the pan to the frame at 33. Side plates 37 are secured to the inner sides of the vertical flanges of the angle bars 31 and extend upwardly to close the lateral spaces between the bottom plate 32 and the lower edges of the frame channels 11. Extending upwardly from the bottom plate 32 is a wedge-shaped partition or baffle 38, which extends transversely of the pan between the two side plates 37. This partition is preferably constructed of two sheet metal plates, having their flanged lower edges secured to the bottom plate 32 and having their contiguous upper edges riveted together. Such partition is disposed in close proximity to the path of movement of the apron slats 12$^a$ down around the sprocket wheels 13, so that a considerable part of the lime carried rearwardly by said slats past the upwardly moving blades of the beater wheel will be dropped over the rear side of the partition into the transverse trough-shaped receptacle 39 defined between the partition 38 and the upwardly inclined rear end of the pan. The blades 16 on the beater wheel swing down through this receptacle and carry up quantities of lime accumulating therein, so that all of this lime is subjected to the distributing action of the beater wheel.

Such relatively small quantities of the lime as are dropped on the front side of the partitions 38 are carried forwardly along the front portion of the pan by the apron slats 12$^a$ which move in close proximity thereto. Each slat conveys some of this lime forwardly in an accumulated mass which, when dropped from the front end of the pan, results in an undistributed accumulation of lime on the ground. To obtain the most effective distribution of even these small quantities, I provide a screen 41 at the front edge of the pan, over which the lime is conveyed by the apron slats 12$^a$. Said screen is preferably in the form of a perforated plate extending transversely between the side angle bars 31 of the pan and having its front edge secured to the transverse angle bar 31' of the pan (Figure 6). The rear edge of the perforated plate is secured under the raised front edge of the bottom plate 32, as indicated at 42. The apron slats in conveying accumulations of lime across the screen 41 will result in the lime sifting down through the openings in the screen at different points fore and aft thereof, so that a uniform distribution will be obtained. As shown in Figure 6, the forward end of the screen plate slopes downwardly, away from the path of the apron slats, to augment this uniform distribution through the openings in the plate.

Figure 3:
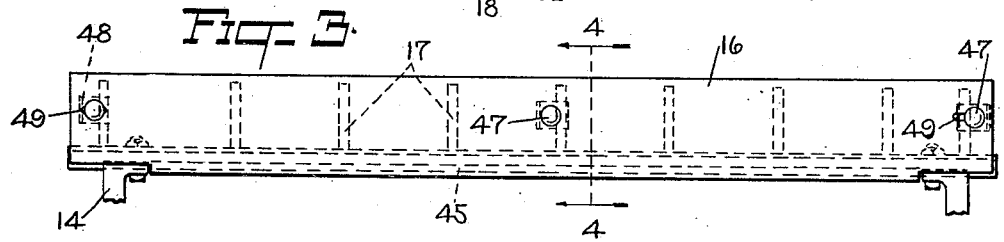
Figure 3 is a view illustrating one of the paddle blades for mounting on the beater cylinder, corresponding to a section taken on the plane of the line 3—3 of Figure 1.
Figure 4:
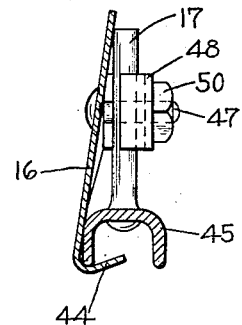
Figure 4 is a transverse sectional view through one of these blades, taken on the plane of the line 4—4 of Figure 3 and illustrating the manner of mounting the same on the beater wheel.

Referring now to the construction of the blades 16 and the manner of mounting the same on the beater cylinder 14, it will be seen from Figures 3 and 4 that each blade consists of a plate extending across the entire width of the beater cylinder and having a reversely bent flange 44 along its inner edge which hooks under the transverse bar 45, from which the beater teeth 17 extend.

In the design of beater cylinder shown, each of these cross bars 45 is of channel-shaped section, and, with such a design of wheel, the flanges 44 are bent to extend into the channel, as shown, although it will be evident that said flange can be arranged to secure an equally effective engagement with other designs of cross bars 45. Such construction positively prevents any possibility of the blades 16 shifting outwardly along the teeth 17, which, if it did occur would result in breakage of the parts, because of the comparatively small clearance between the outer edges of the blades and the slats 12$^a$ on the apron conveyor 12. Each blade is clamped to the beater teeth 17 at spaced points along the length of the blade, by bolts 47 which extend through apertures in the blade and pass back alongside one of the teeth 17. Each bolt passes through a U-shaped clip 48, which has one end embracing the rear side of the adjacent tooth 17 and which has its other side bearing against the back of the blade 16. As shown in Figure 3, the outer ends of the blade 16 may be provided with longitudinal slots 49 for receiving the bolts 47 of the end clips 48, so that these clips may be shifted slightly to effect proper engagement with the end teeth 17. To remove each blade from the beater cylinder, it is only necessary to release the nuts 50 on the bolts 47 sufficiently to permit the flange 44 to be unhooked from the inner side of the cross bar 45, whereupon the blade can be slid endwise off the ends of the teeth 17.

What I claim as my invention and desire to secure by Letters Patent is:

1. The combination with a manure spreader, comprising a rotating beater cylinder, of attachment means for converting said manure spreader into a lime spreader, comprising deflecting means positioned above and in front of said beater cylinder and cooperating therewith for directing the lime rearwardly.

2. The combination with a manure spreader, comprising a rotating beater cylinder, of attachment means for converting said manure spreader into a lime spreader, comprising a shield disposed above and in front of said beater cylinder and arranged so that the rear portion of said shield lies closer to said beater than the forward portion thereof for directing the lime projected by said cylinder rearwardly.

3. The combination with a manure spreader, comprising a load carrying bed and a rotating beater mounted therein, of attachment means positioned above and in front of said beater for converting said manure spreader into a lime spreader, comprising arcuate angle bars mounted on the inner sides of the side walls of said bed, and an arcuate plate extending between said bars, and disposed above said beater for deflecting the projected lime rearwardly.

4. The combination with a manure spreader, comprising a rotating beater and conveyor means for feeding the material thereto, of arcuate-shaped attachment means positioned above and extending from a point adjacent the lower front portion of said beater to a point adjacent the upper rear portion thereof for converting said manure spreader into a lime spreader, said means comprising a gate for governing the rate of feed of the lime to said beater.

5. The combination with a manure spreader, comprising a rotating beater and conveyor means for feeding the fertilizing material thereto, of attachment means for converting said manure spreader into a lime spreader comprising a partition positioned above and in front of said beater and between said beater and the load, said partition being disposed relatively to said conveyor means to define a feeding opening through which all of the lime is conveyed to said beater.

6. The combination with a manure spreader, comprising a rotating beater and conveyor means for feeding the material thereto, of attachment means comprising a deflecting hood positioned above and in front of said beater for converting said manure spreader into a lime spreader, said hood comprising an adjustable gate for governing the rate of feed of the lime to said rotating beater.

7. The combination with a manure spreader, comprising a rotating beater and conveyor means for feeding the material thereto, of attachment means for converting said manure spreader into a lime spreader, comprising a deflecting member extending over said beater and forwardly of the top thereof, and adapted to deflect the lime projected by said beater in a rearward direction, and an adjustable gate associated with said deflecting member for governing the rate of feed of the lime to said rotating beater.

8. The combination with a manure spreader, comprising a rotating beater cylinder, conveyor means for feeding the material thereto, and a wide spread device disposed in rear of said beater cylinder, of attachment means for converting said manure spreader into a lime spreader comprising arcuate angle bars mounted on the spreader, an arcuate plate extending between said angle bars and disposed over said beater cylinder for deflecting the lime projected therefrom rearwardly towards said wide spread device, and an adjustable gate mounted on said angle bars for controlling the feed of the lime by said conveyor means to said beater cylinder.

9. The combination with a manure spreader, comprising a bed, a rotating beater cylinder mounted therein, a feeding apron arranged to have its upper flight convey the fertilizing material to said cylinder and having its lower flight returning to the forward end of the spreader, and a tie rod extending from side to side of said bed between the upper and lower flights of said apron, of attachment means for converting said manure spreader into a lime spreader, comprising a pan disposed below said beater cylinder and said apron, supporting brackets secured to the forward portion of said pan and extending upwardly on opposite sides of said apron, said brackets having notches therein for hooking over said tie rod, and means for detachably securing the rear portions of said pan to said bed.

10. The combination with a manure spreader, comprising a rotating beater and an endless conveyor having transverse members for feeding the fertilizing material to said beater, of attachment means for converting said manure spreader into a lime spreader, comprising a pan adapted to be mounted below said beater and below the return flight of said conveyor, said pan having openings therein for distributing the lime carried forwardly along said pan by the transverse members on said endless conveyor.

11. The combination with a manure spreader, comprising a rotating beater cylinder and a transversely slatted endless apron having its upper flight arranged to convey the fertilizing material rearwardly to said beater cylinder and having its lower flight passing forwardly to the front end of the spreader, of attachment means for converting said manure spreader into a lime spreader, comprising a pan adapted to be disposed below the return flight of said apron, said pan comprising a screen at its forward portion for effecting a sifting distribution of the lime carried forwardly along said pan by said slats.

12. A rotating beater cylinder for a manure spreader having transverse bars and beater teeth extending therefrom, a plurality of blades for mounting on said beater cylinder, each of said blades having a laterally extending flanges at its inner edge for hooking under the inner side of one of said transverse bars, and means for detachably securing each of said blades to the teeth on said transverse bar.

13. A rotating beater cylinder for a manure spreader having transverse bars and beater teeth extending therefrom, a plurality of blades adapted to be mounted on said cylinder transversely thereof, each of said blades having a laterally bent flange formed along its inner edge for hooking under the inner side of one of the transverse bars, U-shaped clips engaging said teeth on the sides thereof oppositely to the side along which the associated blade extends, and bolts passing through said blade and said clips for securing said blade to the teeth.

14. The combination with a manure spreader, comprising a rotating beater cylinder extending transversely of the vehicle, a wide spread device in rear of said beater cylinder and mounted on a shaft extending substantially parallel with said beater cylinder, of attachment means for converting said manure spreader into a lime spreader, comprising a deflecting member extending over said beater and forwardly of the top thereof, and adapted to deflect the lime projected by said beater in a rearward direction, and an adjustable gate associated with said deflecting member for governing the rate of feed of the lime to said rotating beater.

In witness whereof, I hereunto subscribe my name this 18th day of June, 1928.

WILLIAM A. HYLAND.

CERTIFICATE OF CORRECTION.

Patent No. 1,856,417.                                     Granted May 3, 1932, to

WILLIAM A. HYLAND.

It is hereby certified that error appears in the printed specification of the above numbered patent requiring correction as follows: Page 1, line 73, for the word "therein" read thereon; page 4, lines 17 and 18, claim 3, strike out the words "positioned above and in front of said beater", and line 100, claim 9, for "portions" read portion; page 5, line 3, claim 12, for "flanges" read flange; and that the said Letters Patent should be read with these corrections therein that the same may conform to the record of the case in the Patent Office.

Signed and sealed this 14th day of June, A. D. 1932.

M. J. Moore,
Acting Commissioner of Patents.

(Seal)